Dec. 1, 1970 NORIO TSUBOUCHI ET AL 3,544,471

PIEZOELECTRIC CERAMICS

Filed July 9, 1969 5 Sheets-Sheet 1

INVENTORS
NORIO TSUBOUCHI
MASAO TAKAHASHI
TOMEJI OHNO
TSUNEO AKASHI
BY
Sandoe, Hopgood & Calimafde
ATTORNEYS Dec. 1, 1970 NORIO TSUBOUCHI ET AL 3,544,471

PIEZOELECTRIC CERAMICS

Filed July 9, 1969 5 Sheets-Sheet 2

INVENTORS
NORIO TSUBOUCHI
MASAO TAKAHASHI
TOMEJI OHNO
TSUNEO AKASHI

BY Sandoe, Hopgood & Calimafde
ATTORNEYS

Dec. 1, 1970 NORIO TSUBOUCHI ET AL 3,544,471

PIEZOELECTRIC CERAMICS

Filed July 9, 1969 5 Sheets-Sheet 3

INVENTORS
NORIO TSUBOUCHI
MASAO TAKAHASHI
TOMEJI OHNO
TSUNEO AKASHI

BY Sandoe, Hopgood & Calimafde
ATTORNEYS

INVENTORS
NORIO TSUBOUCHI
MASAO TAKAHASHI
TOMEJI OHNO
TSUNEO AKASHI
BY Sandoe, Hopgood & Calimafde
ATTORNEYS INVENTORS
NORIO TSUBOUCHI
MASAO TAKAHASHI
TOMEJI OHNO
TSUNEO AKASHI
BY
Sandoe, Hopgood & Calimafde
ATTORNEYS 3,544,471

PIEZOELECTRIC CERAMICS

Norio Tsubouchi, Masao Takahashi, Tomeji Ohno, and Tsuneo Akashi, Tokyo, Japan, assignors to Nippon Electric Company, Limited, Tokyo, Japan Continuation-in-part of application Ser. No. 721,810, Apr. 16, 1968. This application July 9, 1969, Ser. No. 840,262
Claims priority, application Japan, Apr. 20, 1967, 42/56,173, 42/56,174
Int. Cl. H04b *35/00*
U.S. Cl. 252—62.9 9 Claims

ABSTRACT OF THE DISCLOSURE

A piezoelectric ceramic is disclosed consisting essentially of a solid solution of the three components $$Pb(Sb_{1/2}Z_{1/2})O_3$$

$PbTiO_3$ and $PbZrO_3$, wherein Z represents one element selected from the group consisting of Nb and Ta. Up to about 25 atom percent of Pb may be replaced by at least one element selected from the group consisting of Ba, Sr and Ca. The ceramic may have incorporated in it about 0.1 to 3.0 weight percent of MnO.

This application is a continuation-in-part of U.S. application Ser. No. 721,810 filed Apr. 16, 1968, now abandoned.

This invention relates to piezoelectric materials and, more particularly, to novel piezoelectric ceramics having excellent properties suitable for use in various fields.

One of the typical fields of application of piezoelectric materials is in the manufacture of transducers for transmitting and receiving ultrasonic waves. In such use, the electromechanical coupling factor is very important for evaluating in practice the properties of piezoelectric materials to be used. The electromechanical coupling factor is representative of the efficiency of transforming the electric oscillation into mechanical vibration and of conversely transforming the mechanical vibration into electrical oscillation, a high value thereof generally indicating better efficiency of interconversion, particularly for piezoelectric materials used in the manufacture of transducers.

Piezoelectric materials are evaluated in accordance with certain fundamental factors, such as dielectric loss, dielectric constant and the mechanical quality factor. With regard to piezoelectric materials used for transducers, it is preferred that the dielectric loss be small, that the desirable value of the dielectric constant be large or small depending on the electric loads, the mechanical quality factor being not so important.

The foregoing subject matter is described in detail in, for example, D. Berlincourt et al., "Transducer Properties of Lead Titanate Zirconate Ceramics," "IRE Transactions on Ultrasonic Engineering, February 1960, pp. 1–6 and in R. C. V. Macario, "Design Data for Band-Pass Ladder Filters Employing Ceramic Resonators," Electronic Engineering, vol. 33, No. 3 (1961), pp. 171–177.

Another typical field of application of piezoelectric materials is in the manufacture of elements for ceramic filters. In such applications, it is necessary to provide an electromechanical coupling factor having an optimum value selected from a wide band ranging from an extremely great value to a very small one, it being desirable that the value of the mechanical quality factor be as large as possible. This fact is fully described in, for example, the paper of Macario referred to above. The mechanical quality factor is reciprocally related to the energy consumed by the material during energy conversion, a large mechanical quality factor accounting for smaller energy consumption.

The transducer elements of mechanical filters provide still other important fields of application of piezoelectric ceramics. In this case, both the electromechanical coupling factor and the mechanical quality factor should desirably be as large as possible.

It is well known, however, that conventional piezoelectric ceramics, for example, barium titanate ($BaTiO_3$) and lead titanate-zirconate [$Pb(Ti \cdot Zr)O_3$] exhibit small electromechanical coupling factors and are generally not suitable for practical use. Improvement of this factor has been made only by way of incorporating various additional constituents into the ceramics.

The object of this invention is to provide novel piezoelectric ceramics exhibiting large electromechanical coupling factors.

Another object of this invention is to provide novel piezoelectric ceramics suited for use in certain fields, such as the manufacture of transducers for transmitting and receiving ultrasonic waves where a very large electromechanical coupling factor is required.

Another object of this invention is to provide piezoelectric ceramics having large values of both the electromechanical coupling factor and mechanical quality factor.

A still further object of this invention is to provide piezoelectric ceramics suited for use in fields involving, for example, the manufacture of elements for ceramic filters and transducer elements for mechanical filters, where a large or broadly ranging electromechanical coupling factor and large mechanical quality factor are required.

This invention is based on the discovery that ceramic compositions may be produced consisting essentially of a solid solution of the system $$Pb(Sb_{1/2}Z_{1/2})O_3\text{-}PbTiO_3\text{-}PbZrO_3$$

where Z represents an element selected from Nb and Ta, said ceramic exhibiting excellent piezoelectric activity and therefore having practical utility.

The above ceramic compositions contain lead (Pb) as a divalent metallic element and also titanium (Ti) and zirconium (Zr) as tetravalent metallic elements. Moreover, the element antimony (Sb) and an element selected from the group niobium (Nb) and tantalum (Ta) are so proportioned that they may be, as a whole, substantially equivalent to a tetravalent metallic element. The lead (Pb) in the above composition may be replaced by up to about 25 atom percent of at least one element selected from the group consisting of barium (Ba), strontium (Sr) and calcium (Ca).

Where niobium (Nb) is selected for Z, the ceramic material is comprised of the components $$Pb(Sb_{1/2}Nb_{1/2})O_3\text{-}PbTiO_3\text{-}PbZrO_3$$

the ternary system represented by the compositional formula $[Pb(Sb_{1/2}Nb_{1/2})O_3]_x[PbTiO_3]_y[PbZrO_3]_z$, where $x$, $y$ or $z$ is the molecular ratio of each component and $x+y+z=1.00$. It has been found advantageous that the compositions for achieving effective properties should preferably be within the range determined by the following combination of the molecular ratios $x$, $y$ and $z$:

| x | y | z |
|---|---|---|
| 0.01 | 0.61 | 0.38 |
| 0.01 | 0.09 | 0.90 |
| 0.05 | 0.05 | 0.90 |
| 0.30 | 0.30 | 0.40 |
| 0.10 | 0.70 | 0.20 |

Where tantalum (Ta) is selected for Z, the advantageous effective range of the ceramic compositions is given by the formula $$[Pb(Sb_{1/2}Ta_{1/2})O_3]_x[PbTiO_2]_y[PbZrO_3]_z$$

where $x+y+z=1.00$, as determined by the following combination of molecular ratios $x$, $y$ and $z$:

| x | y | z |
|---|---|---|
| 0.01 | 0.55 | 0.44 |
| 0.01 | 0.09 | 0.90 |
| 0.05 | 0.05 | 0.90 |
| 0.30 | 0.05 | 0.65 |
| 0.30 | 0.40 | 0.30 |
| 0.05 | 0.65 | 0.30 |

It has been found that the incorporation of manganese oxide in an amount of 0.10 to 3.0 weight percent in the form of MnO to any of the aforementioned compositions improves the mechanical quality factor of the composition without substantially adversely decreasing the electromechanical coupling factor, whereby useful piezoelectric ceramics are produced applicable as elements for ceramic filters, as transducer elements for mechanical filters or the like.

Among the conventional piezoelectric ceramics are the solid solution ceramics of the ternary system $$Pb(Mg_{1/3}Nb_{2/3})O_3\text{-}PbTio_3\text{-}PbZrO_3$$

such as disclosed in U.S. Pat. No. 3,268,453 granted Aug. 23, 1966 to H. Ouchi et al. This conventional ceramic material by itself, however, does not improve the piezoelectric properties of previous $PbTiO_3$-$PbZrO_3$ ceramics, and improved piezoelectric ceramic materials are obtained only by adding thereto at least one of oxides of the group manganese, cobalt, nickel, iron and chromium in amounts up to about 3 weight percent. In contrast, the $$Pb(Sb_{1/2}Z_{1/2})O_3\text{-}PbTio_3\text{-}PbZrO_3$$

compositions of this invention, where Z represents Nb or Ta, markedly improve the piezoelectric properties without the use of any additional constituent. This difference in improvement of piezoelectric properties between the conventional compositions and the novel compositions of this invention is, it is believed, due to the fact that the conventional compositions use magnesium (Mg), an element belonging to the Group II–A in the Periodic Table, in conjunction with a Group V–A element niobium (Nb), as ingredients, whereas, in the compositions of this invention a Group V–B element, antimony (Sb), is used in conjunction with a Group V–A element niobium (Nb) or tantalum (Ta).

Excellent piezoelectric activities of the ceramic compositions of this invention will be apparent from the following more particular description of preferred examples of this invention, as illustrated in the accompanying drawings, wherein:

FIGS. 7 and 8 are graphs showing the electromechanical coupling factor and the mechanical quality factor of modified ceramics of this invention as a function of the amount of manganese oxide added; while:

FIGS. 1, 2, 3 and 7 are for the novel ternary system $Pb(Sb_{1/3}Nb_{1/3})O_3$-$PbTiO_3$-$PbZrO_3$ among the ceramic compositions of this invention; and FIGS. 4, 5, 6 and 8 are for the novel ternary system $Pb(Sb_{1/2}Ta_{1/2})O_3$-$PbTiO_3$-$PbZrO_3$ among the ceramic compositions of this invention.

EXAMPLES

Figure 1:
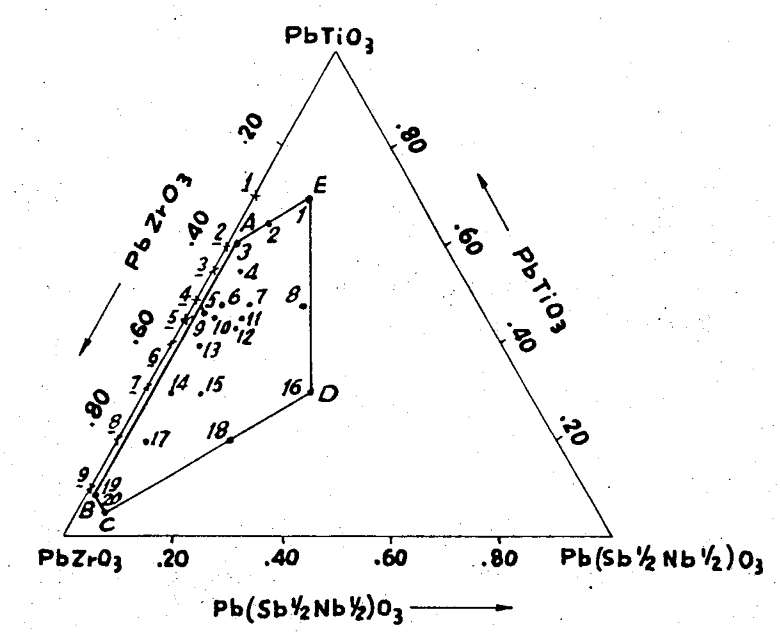
FIGS. 1 and 4 are the triangular compositional diagrams of the ternary system showing both the effective ranges of the compositions of this invention and the specific compositions of the examples.

Powdered materials of lead monoxide (PbO), antimony sesquioxide ($Sb_2O_3$), niobium pentoxide ($Nb_2O_5$), titanium dioxide ($TiO_2$), and zirconium dioxide ($ZrO_2$) were used as starting materials to obtain the $$Pb(Sb_{1/2}Nb_{1/2})O_3\text{-}PbTiO_3\text{-}PbZrO_3$$

ceramics of this invention, unless otherwise stated. These powdered materials were weighed so as to provide final specimens having the compositional proportions shown in Table 1. The above materials were moreover used together with manganese carbonate ($MnCO_3$) to produce the same ceramics containing manganese monoxide (MnO), unless otherwise mentioned. These were weighed so that the final specimens would be comprised of the basic composition having various proportions of molecular ratios $x$, $y$ and $z$ and manganese monoxide (MnO) in an amount from 0.1 to 3.0 weight percent as shown in Table 3. In addition, either barium carbonate ($BaCO_3$), strontium carbonate ($SrCO_3$) or calcium carbonate ($CaCO_3$) was added to each group of the above starting materials to provide the ceramics having the compositions shown in Table 5, in which $u$ atom percent of lead (Pb) of the basic composition (having the molecular ratios $x$, $y$ and $z$ of the components $Pb(Sb_{1/2}Nb_{1/2})O_3$, $PbTiO_3$ and $PbZrO_3$) is replaced by Me in the table. The powdered materials of lead monoxide (PbO), antimony sesquioxide ($Sb_2O_3$), tantalum pentoxide ($Ta_2O_5$), titanium dioxide ($TiO_2$), and zirconium dioxide ($ZrO_2$) were used as starting materials to obtain the $$Pb(Sb_{1/2}Ta_{1/2})O_3\text{-}PbTiO_3\text{-}PbZrO_3$$

ceramics of this invention, unless otherwise stated. These powders were weighed so that the final specimens would have the compositional proportions shown in Table 2.

Also, the above materials plus manganese carbonate ($MnCO_3$) were used to produce the same ceramics containing manganese monoxide (MnO), unless otherwise stated. These were weighed to provide final specimens having the basic compositions and manganese oxide as shown in Table 4. Besides, barium carbonate ($BaCO_3$), either strontium carbonate ($SrCO_3$) or calcium carbonate ($CaCO_3$) was added to each group of the above starting materials to obtain the ceramics having the compositions shown in Table 6, except that $u$ atom percent of lead (Pb) contained in the basic composition (having the molecular ratios $x$, $y$ and $z$ of the components $Pb(Sb_{1/2}Ta_{1/2})O_3$, $PbTiO_3$ and $PbZrO_3$) was replaced by Me (Ba, Sr or Ca).

In this instance, manganese carbonate ($MnCO_3$) and barium, strontium or calcium carbonate ($BaCO_3$, $SrCO_3$ or $CaCO_3$) were weighed calculated on the basis of manganese monoxide (MnO) and barium, strontium or calcium oxide (BaO, SrO or CaO), respectively.

In addition, the powders of lead monoxide, titanium dioxide and zirconium dioxide were weighed to provide the conventional lead titanate-zirconate ceramics having the compositional proportions shown in Table 7.

The respective powders were mixed in a ball mill with distilled water. The mixed powders were subjected to filtration, dried, crushed, then pre-sintered at 900° C. for one hour, and again crushed. Thereafter, the mixtures, with a small amount of distilled water being added thereto, were press-molded into discs of 20 mm. in diameter at a pressure of 700 kg./cm.$^2$ and sintered in an atmosphere of lead monoxide (PbO) for one hour at a temperature between 1270° C. and 1310° C. The resulting ceramic discs were polished on both surfaces to the thickness of one millimeter, provided with silver electrodes on both surfaces, and thereafter piezoelectrically activated through the polarization treatment at 100° C. for one hour under an applied D.C. electric field of 30 kv./cm. in the case where the $Pb(Sb_{1/2}Nb_{1/2})O_3$ or $Pb(Sb_{1/2}Ta_{1/2})O_3$ content of the specimens exceeded 0.10. On the other hand, discs were activated at room temperature for one hour under an applied D.C. electric field of 40 kv./cm. for specimens whose $Pb(Sb_{1/2}Nb_{1/2})O_3$ or $Pb(Sb_{1/2}Ta_{1/2})O_3$ had a content of 0.10 or less.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IRE standard circuit. The value of $k_r$ was calculated by the resonant to antiresonant frequency method. The dielectric constant ($\epsilon$) and the dielectric loss (tan $\delta$) were also measured at a frequency of 1 kHz. at room temperature.

Tables 1 through 7 show typical results obtained. In the tables, the specimens are arranged according to the content of $PbTiO_3$ and there are also listed several values of Curie temperature which were determined through measurement of temperature variation in the dielectric constant ($\epsilon$). The novel compositions of the specimens of Tables 1 and 2 are shown with black points in FIGS. 1 and 4, respectively, while the conventional compositions of the specimens of Table 7 are indicated by crosses in the same figures. In Tables 3 and 4, the specimens are arranged according to the $Pb(Sb_{1/2}Z_{1/2})O_3$ content (Z is Nb or Ta) of the basic composition, while those containing the same basic composition are arranged according to increase in the amount of manganese oxide (MnO).

Figure 2:
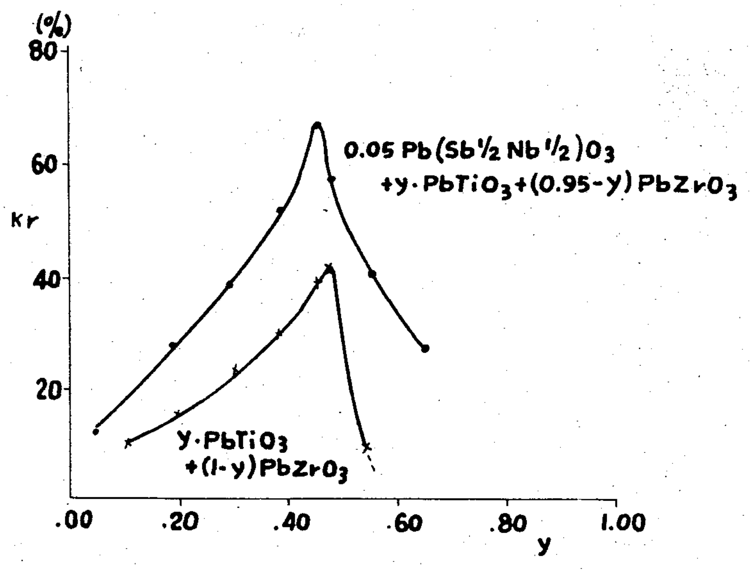
FIGS. 2 and 5 are graphs showing the electromechanical coupling factors of both the conventional lead titanate-zirconate ceramics and the ceramics of this invention as a function of compositional change of lead titanate and lead zirconate in both the ceramics.
Figure 5:
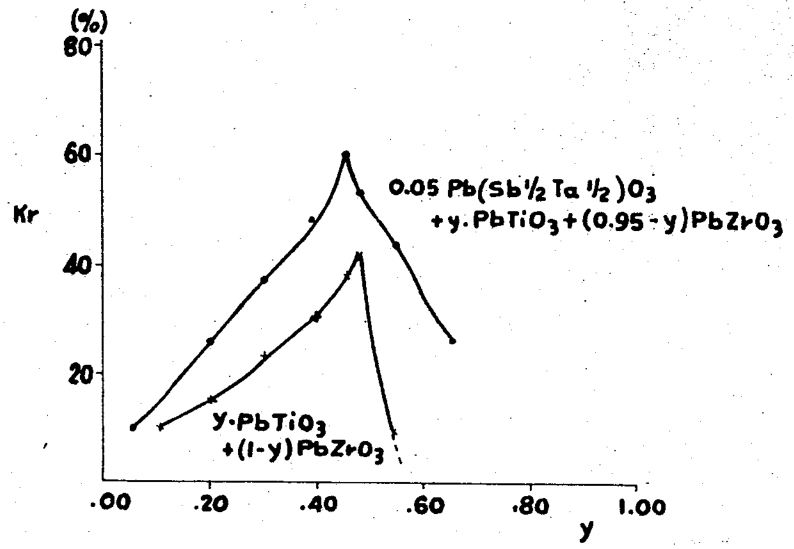

Comparison of the results for the specimens Nos. 9 and 10 of Table 1 or specimens Nos. 5, 8 and 9 of Table 2 with those for the specimen No. 4 of Table 7 will reveal that the greatest $k_r$ values of the novel ceramics of this invention are far superior to the maximum $k_r$ value of the conventional lead titanate-zirconate ceramics which have been known as the most excellent piezoelectric ceramic material. Moreover, comparison of the results in Table 1 or 2 with those in Table 7, particularly between the novel and conventional ceramics in which the ratios of the $PbTiO_3$ content and $PbZrO_3$ content are similar to each other, will also reveal that the ceramics of this invention exhibit remarkably improved $k_r$ values. This latter fact will be more clearly understood from FIG. 2 or 5, wherein the thick line curve represents the $k_r$ values of the novel ceramic containing 0.05 of the component $Pb(Sb_{1/2}Nb_{1/2})O_3$ [FIG. 2] or the component $Pb(Sb_{1/2}Ta_{1/2})O_3$ [FIG. 5], the varying content $y$ of $PbTiO_3$, and the remaining content of $PbZrO_3$; while the fine line curve shows the $k_r$ values of conventional lead titanate-zirconate ceramics with varying content $y$ of $PbTiO_3$.

As is seen from the above, this invention provides markedly improved and useful piezoelectric ceramics having superior piezoelectric activities.

Figure 4:
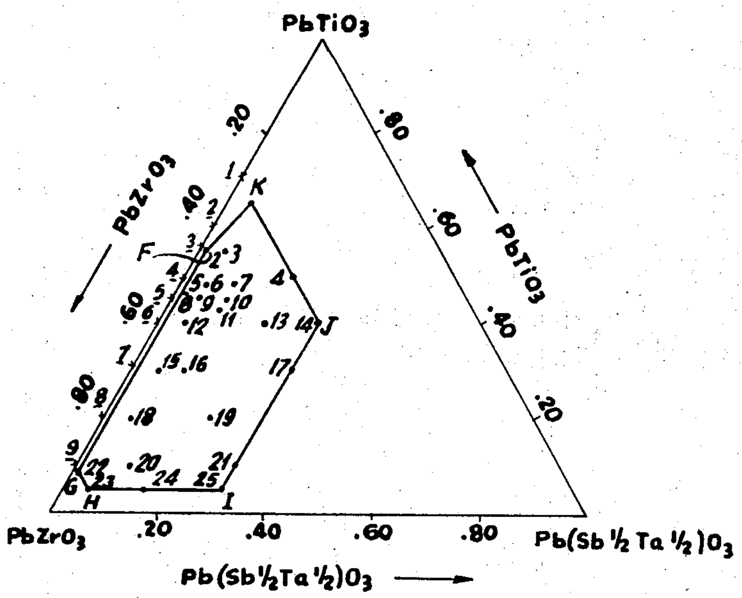

In the novel ceramics of the system $Pb(Sb_{1/2}Z_{1/2})O_3$-$PbTiO_3$-$PbZrO_3$ (Z is Nb or Ta) of this invention, the superior piezoelectric activities as mentioned above are provided when the composition is represented by the formula:

$$[Pb(Sb_{1/2}Z_{1/2})O_3]_x[PbTiO_3]_y[PbZrO_3]_z$$

when $x$, $y$ and $z$ represent a set of molecular ratios and $x+y+z=1.00$, and where Z represents one element selected from the group Nb and Ta, and the compositions fall within the area A–B–C–D–E of FIG. 1 of the drawings where Nb is selected for Z and within the area F–G–H–I–J–K of FIG. 4 of the drawings where Ta is selected for Z. The sets for molecular ratios of the vertices of each area are as follows:

| | x | y | z |
|---|---|---|---|
| A | 0.01 | 0.61 | 0.38 |
| B | 0.01 | 0.09 | 0.90 |
| C | 0.05 | 0.05 | 0.90 |
| D | 0.30 | 0.30 | 0.40 |
| E | 0.10 | 0.70 | 0.20 |
| F | 0.01 | 0.55 | 0.44 |
| G | 0.01 | 0.09 | 0.90 |
| H | 0.05 | 0.05 | 0.90 |
| I | 0.30 | 0.05 | 0.65 |
| J | 0.30 | 0.40 | 0.30 |
| K | 0.05 | 0.65 | 0.30 |

In cases where the $Pb(Sb_{1/2}Nb_{1/2})O_3$ or $$Pb(Sb_{1/2}Ta_{1/2})O_3$$

content is less than that falling within the above-mentioned area, it is sometimes impossible to complete the sintering in the manufacture of ceramics and besides the piezoelectric activities of the ceramics obtained are generally inferior to or nearly equal to those of the conventional lead titanate-zirconate ceramics or, even if improved, not desirable for practical use. If the $Pb(Sb_{1/2}Z_{1/2})O_3$ (Z represents Nb or Ta) content is more than that falling within the above-mentioned area, accomplishment of the sintering is very difficult and the ceramics obtained do not generally exhibit practicable piezoelectric properties. Where the $PbTiO_3$ content is more than or less than the effective content falling within the above-mentioned area, the piezoelectric properties of the ceramics tend to deteriorate so as to make their use undesirable. Finally, in the case where the $PbZrO_3$ content is less than the effective content falling within the above-mentioned area, it is difficult to complete the sintering, to carry out the polarization treatment and achieve the desired optimum results, and obtain a useful piezoelectric ceramic. Where the $PbZrO_3$ content is more than the effective amount, the piezoelectric ceramic is generally not useful and exhibits markedly inferior piezoelectric properties.

In view of the above, it is advantageous to have the compositions of the ceramics of this invention fall within any of the areas specified above. These ceramics exhibit excellent piezoelectric activities and have a high Curie temperature, as shown in Tables 1 and 2. In addition, these piezoelectric activities are not lost when heated to elevated temperatures.

Figure 3:
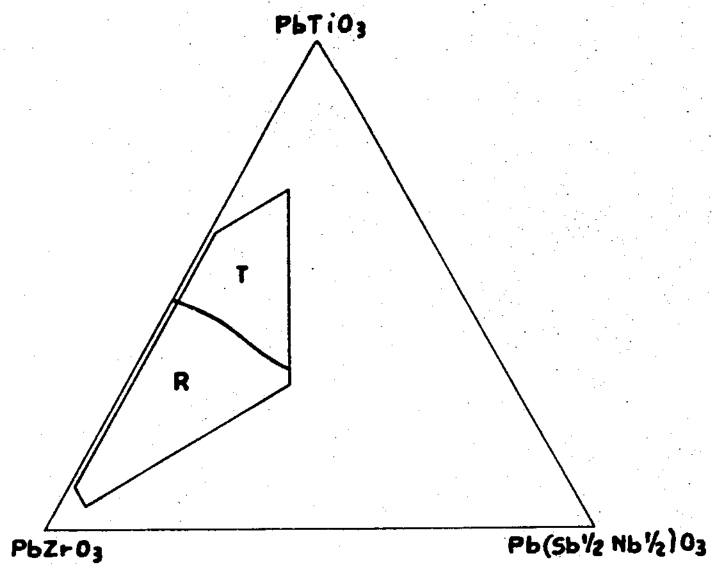
FIGS. 3 and 6 are the phase diagrams of the ternary system of this invention.
Figure 6:
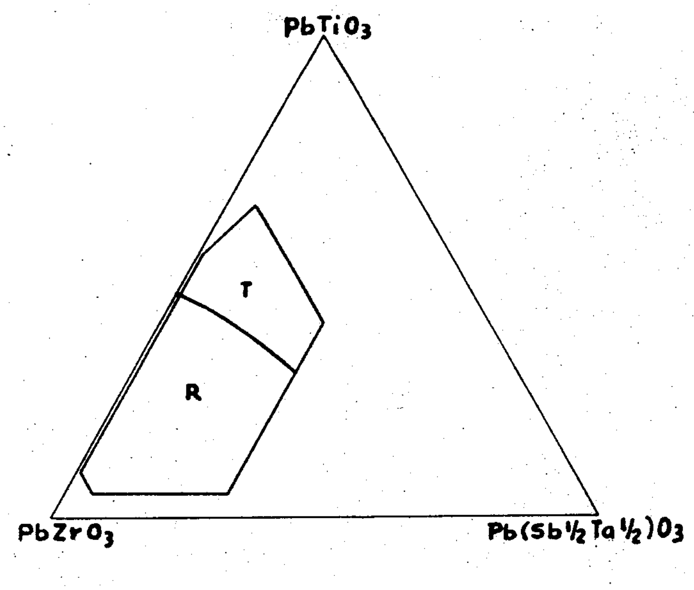

The ternary system of $Pb(Sb_{1/2}Nb_{1/2})O_3$ or $$Pb(Sb_{1/2}Ta_{1/2})O_3\text{-}PbTiO_3\text{-}PbTiO_3\text{-}PbZrO_3$$

of this invention exists in a solid solution over a large portion of the compositions. Such solid solutions have a perovskite-type crystalline structure. FIGS. 3 and 6 show the crystalline phases of the ceramic compositions falling within the area A–B–C–D–E of FIG. 1 and F–G–H–I–J–K of FIG. 4, respectively, as determined at room temperature by the powder method of X-ray analysis. These compositions have a perovskite-type crystalline structure and belong to either the tetragonal phase (indicated by T in the figures) or the rhombohedral phase (indicated by R). The morphotropic phase boundary is shown with a thick line in each figure. In general, the value of $k_r$ is remarkably high for the compositions in the vicinity of this phase boundary, while the $Q_m$ value is large for the compositions remote from this boundary.

Figure 7:
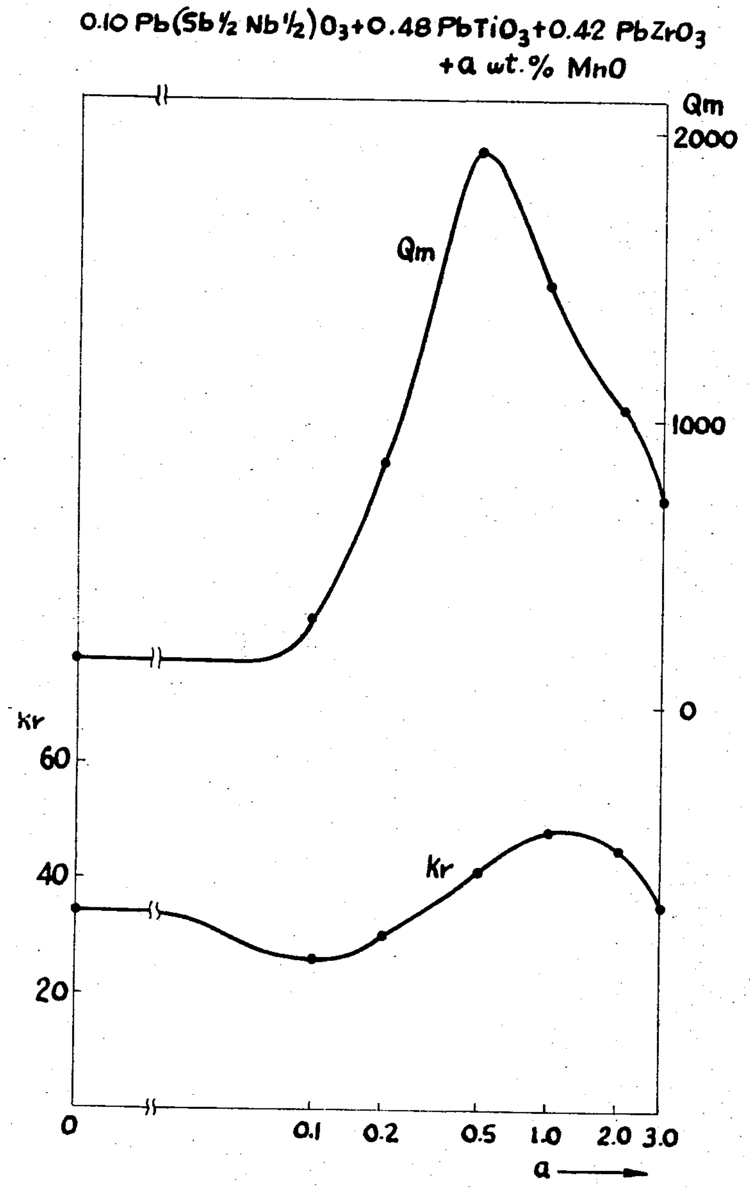
Figure 8:
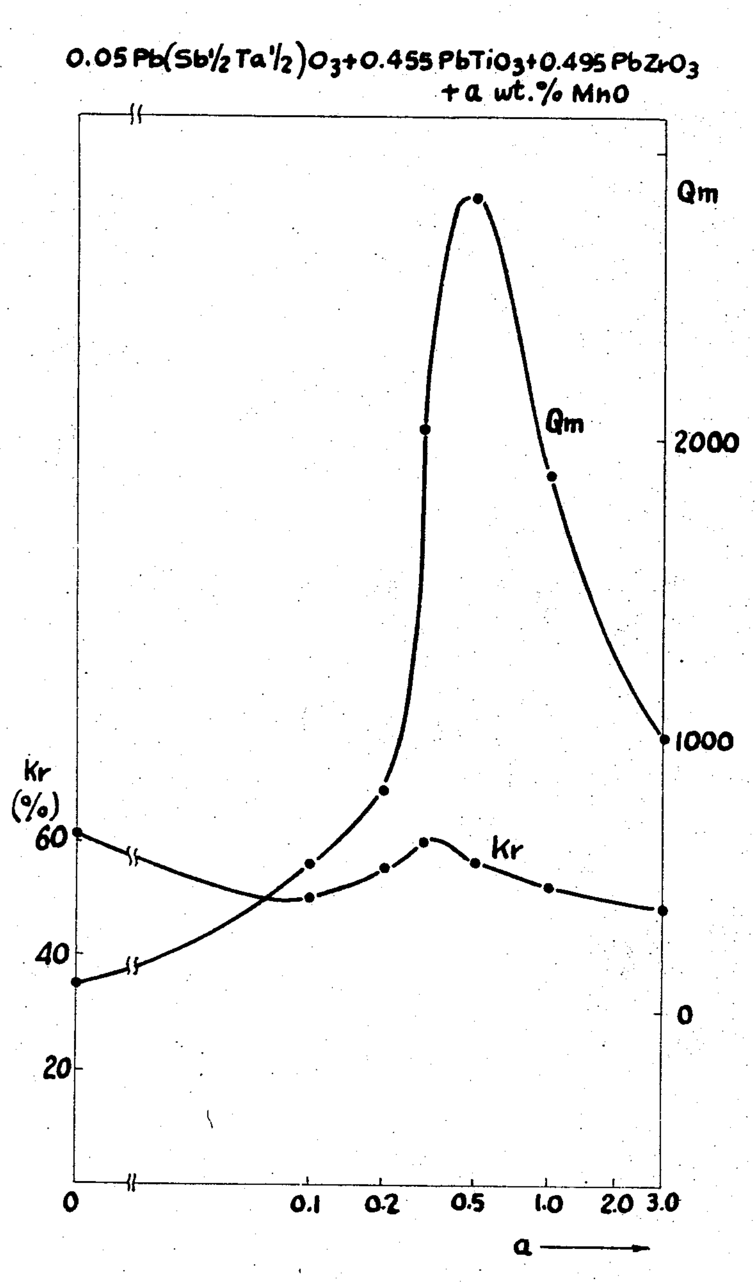

Tables 3 and 4 reveal that incorporation of about 0.10 to 3.0 wt. percent MnO to the basic compositions $$Pb(Sb_{1/2}Nb_{1/2})O_3\text{-}PbTiO_3\text{-}PbZrO_3$$

and $Pb(Sb_{1/2}Ta_{1/2})O_3$-$PbTiO_3$-$PbZrO_3$ results in an increased or widely ranged value of $k_r$ and a sharply enhanced value of $Q_m$. In other words, such incorporation provides excellent material for use in the elements of ceramic filters, the transducer elements of mechanical filters or other fields where a high or widely ranging $k_r$ and a large $Q_m$ are both required. FIGS. 7 and 8 show the relation between the content $a$ of MnO and the resultant piezoelectric properties ($k_r$ and $Q_m$) in specimens Nos. 10 to 16 of Table 3 and Nos. 51 to 57 of Table 4, respectively, as representative examples. It will be clearly seen from FIGS. 7 and 8 that excellent piezoelectric properties are obtainable if the content of MnO lies within a range from 0.10 to 3.0 weight percent.

Where the MnO content is less than 0.10 wt. percent, little improvement of piezoelectric properties is achieved. If the MnO content exceeds 3.0 wt. percent, $Q_m$ decreases considerably and it becomes difficult to obtain a uniform solid solution of the additive agent and the basic composition and to accomplish the polarization treatment. Thus, the effective range of the MnO content is defined from about 0.10 to 3.0 wt. percent. If the basic compositions do not fall within the above-mentioned areas A–B–C–D–E and F–G–H–I–J–K, the resultant ceramic possess rather inferior piezoelectric properties.

Tables 5 and 6 reveal that excellent piezoelectric properties are still possessed by the ceramics in which a part of Pb of the basic composition is replaced by one of the elements Ba, Sr or Ca. In general, at least one of the elements Ba, Sr and Ca may replace up to about 25 atom percent of Pb contained in the basic composition.

It should be noted here that the improvement made in the piezoelectric properties by incorporation of MnO clearly results from presence of manganese ions. There are various known methods for introducing manganese ions into presence. For example, manganese ions may be put into existence by using as a starting material manganese oxide itself such as MnO or $MnO_2$ or other manganese comopund such as $MnCO_3$ which is easily decomposed at elevated temperature to form manganese oxide. If manganese compound other than MnO is utilized, it should be used in an equivalent amount as calculated on the basis of MnO. In the above examples, $MnCO_3$ is mostly used instead of MnO. Where MnO is used, it is exemplified in the specimens with double asterisks in Tables 3 and 4.

It will be apparent that the starting materials to be used in the manufacture of the ceramics of this invention are not limited to those used in the above examples. It is found that those oxides may be used which are easily decomposed at elevated temperautre to form required compositions, as exemplified by the use of $Pb_3O_4$ to produce PbO in the examples. Also, those salts such as oxalates or carbonates may be used in place of the oxides used in the examples, as these are easily decomposed into the respective oxides at elevated temperature. In addition, hydroxides of the same character as above, such as $Nb(OH)_5$, may be used instead of the oxides such as $Nb_2O_5$. As will be appreciated, excellent piezoelectric ceramics having similar properties to the above examples may also be obtained by preparing separately the powdered material of each of the components $$Pb(Sb_{1/2}Nb_{1/2})O_3$$

or $Pb(Sb_{1/2}Ta_{1/2})O_3$, $PbTiO_3$ and $PbZrO_3$ in advance and by using them as starting materials for subsequent mixing.

It is usual for niobium pentoxide ($Nb_2O_5$), tantalum pentoxide ($Ta_2O_5$) and zirconium dioxide ($ZrO_2$) which are available in the market contain several percent of tantalum pentoxide ($Ta_2O_5$), niobium pentoxide ($Nb_2O_5$) and hafnium dioxide ($HfO_2$), respectively. Accordingly, the ceramic compositions of this invention are allowed to contain small amounts of these oxides or elements existing in the materials available in the market. Moreover, it is appreciated that the incorporation of a small amount of another agent in addition to or other than manganese oxide to the ceramic compositions of this invention may further improve the piezoelectric properties, similarly as recognized in the conventional lead titanate-zirconate ceramics. It will be understood from the foregoing that the ceramic compositions of this invention may include appropriate additives.

While there have been described what at present are believed to be the preferred examples of this invention, it will be obvious that various modifications can be made therein without departing from the scope of this invention and that this invention covers all the ceramic compositions as specified in the appended claims.

TABLE 1

| Number | Mol ratio of composition: $Pb(Sb_{1/2}Nb_{1/2})O_3$ $x$ | $PbTiO_3$ $y$ | $PbZrO_3$ $z$ | $k_r$, percent | $Q_m$ | $\epsilon$ | tan $\delta$, percent | Curie temperature °C |
|---|---|---|---|---|---|---|---|---|
| 1 | 0.10 | 0.70 | 0.20 | 7 | 180 | 345 | 4.7 | |
| 2 | 0.05 | 0.65 | 0.30 | 27 | 245 | 430 | 1.9 | |
| 3 | 0.01 | 0.61 | 0.38 | 25 | 180 | 500 | 2.8 | |
| 4 | 0.05 | 0.55 | 0.40 | 41 | 120 | 660 | 2.2 | |
| 5 | 0.01 | 0.48 | 0.51 | 72 | 90 | 1,680 | 2.6 | |
| 6* | 0.05 | 0.48 | 0.47 | 57 | 100 | 1,610 | 2.4 | |
| 7 | 0.10 | 0.48 | 0.42 | 34 | 150 | 1,030 | 2.3 | |
| 8 | 0.20 | 0.48 | 0.32 | 13 | 280 | 400 | 2.5 | |
| 9 | 0.02 | 0.47 | 0.51 | 81 | 85 | 1,760 | 2.6 | 370 |
| 10 | 0.05 | 0.455 | 0.495 | 67 | 85 | 1,310 | 3.0 | 340 |
| 11* | 0.10 | 0.45 | 0.45 | 39 | 125 | 1,245 | 2.5 | |
| 12 | 0.10 | 0.43 | 0.47 | 46 | 110 | 1,310 | 2.9 | 310 |
| 13 | 0.05 | 0.40 | 0.55 | 52 | 115 | 760 | 3.7 | |
| 14 | 0.05 | 0.30 | 0.65 | 39 | 130 | 580 | 3.7 | |
| 15 | 0.10 | 0.30 | 0.60 | 33 | 215 | 655 | 3.6 | |
| 16 | 0.30 | 0.30 | 0.40 | 8 | 170 | 530 | 3.5 | 275 |
| 17 | 0.05 | 0.20 | 0.75 | 28 | 300 | 460 | 3.7 | |
| 18 | 0.20 | 0.20 | 0.60 | 6 | 320 | 330 | 2.8 | |
| 19 | 0.01 | 0.09 | 0.90 | 15 | 500 | 290 | 4.3 | |
| 20 | 0.05 | 0.05 | 0.90 | 13 | 360 | 390 | 4.2 | |

* See footnote to Table 2.

TABLE 2

| Number | Mol ratio of composition Pb $(Sb_{1/2}Nb_{1/2})O_3$ x | PbTiO₃ y | PbZrO₃ z | $k_r$, percent | $Q_m$ | ε | tan δ, percent | Curie temperature, °C. |
|---|---|---|---|---|---|---|---|---|
| 1 | 0. 05 | 0. 65 | 0. 30 | 27 | 235 | 435 | 2. 1 | |
| 2 | 0. 01 | 0. 55 | 0. 44 | 14 | 210 | 490 | 2. 5 | |
| 3 | 0. 05 | 0. 55 | 0. 40 | 42 | 120 | 670 | 2. 4 | |
| 4 | 0. 20 | 0. 50 | 0. 30 | 12 | 225 | 330 | 2. 9 | |
| 5 | 0. 01 | 0. 48 | 0. 51 | 63 | 110 | 1, 390 | 3. 5 | |
| 6* | 0. 05 | 0. 48 | 0. 47 | 54 | 105 | 1, 550 | 2. 8 | |
| 7 | 0. 10 | 0. 48 | 0. 42 | 28 | 150 | 845 | 2. 5 | |
| 8 | 0. 02 | 0. 47 | 0. 51 | 69 | 100 | 1, 410 | 2. 7 | |
| 9 | 0. 05 | 0. 455 | 0. 495 | 61 | 90 | 1, 210 | 3. 1 | 320 |
| 10* | 0. 10 | 0. 45 | 0. 45 | 32 | 95 | 960 | 3. 4 | |
| 11 | 0. 10 | 0. 43 | 0. 47 | 43 | 120 | 1, 180 | 3. 0 | 295 |
| 12 | 0. 05 | 0. 40 | 0. 55 | 48 | 115 | 845 | 4. 0 | |
| 13 | 0. 20 | 0. 40 | 0. 40 | 20 | 140 | 640 | 2. 5 | 260 |
| 14 | 0. 30 | 0. 40 | 0. 30 | 8 | 270 | 190 | 3. 3 | |
| 15 | 0. 05 | 0. 30 | 0. 65 | 37 | 140 | 690 | 4. 0 | |
| 16 | 0. 10 | 0. 30 | 0. 60 | 26 | 220 | 650 | 4. 0 | |
| 17 | 0. 30 | 0. 30 | 0. 40 | 12 | 235 | 380 | 3. 1 | |
| 18 | 0. 05 | 0. 30 | 0. 75 | 26 | 280 | 505 | 4. 1 | |
| 19 | 0. 20 | 0. 20 | 0. 60 | 12 | 160 | 410 | 3. 6 | |
| 20 | 0. 10 | 0. 10 | 0. 80 | 14 | 420 | 495 | 3. 8 | |
| 21 | 0. 30 | 0. 10 | 0. 60 | 6 | 670 | 300 | 2. 7 | |
| 22 | 0. 01 | 0. 09 | 0. 90 | 11 | 410 | 270 | 4. 6 | |
| 23 | 0. 05 | 0. 05 | 0. 90 | 10 | 290 | 405 | 4. 4 | |
| 24 | 0. 15 | 0. 05 | 0. 80 | 8 | 400 | 475 | 3. 5 | |
| 25 | 0. 30 | 0. 05 | 0. 65 | 4 | 420 | 260 | 2. 9 | |

NOTE.—In the manufacture of the specimens whose Nos. have an asterisk (*) in Tables 1 and 2, triplumbic tetroxide ($Pb_3O_4$) was used instead of lead monoxide (PbO) as one of the starting materials. In the manufacture of specimens with double asterisks (**), manganese dioxide ($MnO_2$) was used instead of manganese carbonate as one of the starting materials.

TABLE 3

| Number | Mol ratio of basic composition Pb $(Sb_{1/2}Nb_{1/2})O_3$ x | PbTiO₃ y | PbZrO₃ z | Additive agent MnO, wt. percent | $k_r$, percent | $Q_m$ | ε | tan δ, percent |
|---|---|---|---|---|---|---|---|---|
| 1 | 0. 30 | 0. 30 | 0. 40 | 0. 00 | 8 | 170 | 530 | 3. 5 |
| 2 | 0. 30 | 0. 30 | 0. 40 | 0. 10 | 8 | 390 | 490 | 1. 2 |
| 3 | 0. 30 | 0. 30 | 0. 40 | 0. 50 | 9 | 2, 270 | 420 | 1. 1 |
| 4 | 0. 30 | 0. 30 | 0. 40 | 3. 00 | 5 | 650 | 380 | 3. 1 |
| 5 | 0. 10 | 0. 30 | 0. 60 | 0. 00 | 33 | 215 | 655 | 3. 6 |
| 6 | 0. 10 | 0. 30 | 0. 60 | 0. 10 | 33 | 330 | 600 | 1. 1 |
| 7 | 0. 10 | 0. 30 | 0. 60 | 0. 20 | 36 | 1, 370 | 310 | 0. 8 |
| 8 | 0. 10 | 0. 30 | 0. 60 | 0. 50 | 34 | 3, 480 | 440 | 0. 8 |
| 9 | 0. 10 | 0. 30 | 0. 60 | 1. 00 | 36 | 3, 160 | 400 | 0. 8 |
| 10 | 0. 10 | 0. 48 | 0. 42 | 0. 00 | 34 | 150 | 1, 030 | 2. 3 |
| 11 | 0. 10 | 0. 48 | 0. 42 | 0. 10 | 26 | 300 | 680 | 1. 2 |
| 12 | 0. 10 | 0. 48 | 0. 42 | 0. 20 | 30 | 850 | 660 | 0. 8 |
| 13 | 0. 10 | 0. 48 | 0. 42 | 0. 50 | 41 | 1, 920 | 900 | 1. 0 |
| 14** | 0:10 | 0. 48 | 0. 42 | 1. 0 | 48 | 1, 660 | 1; 070 | 1. 5 |
| 15 | 0. 10 | 0. 48 | 0. 42 | 2. 0 | 45 | 1, 040 | 890 | 1. 8 |
| 16 | 0. 10 | 0. 48 | 0. 42 | 3. 0 | 35 | 710 | 760 | 2. 0 |
| 17 | 0. 10 | 0. 70 | 0. 20 | 0. 00 | 7 | 180 | 345 | 4. 7 |
| 18 | 0. 10 | 0. 70 | 0. 20 | 0. 10 | 7 | 390 | 300 | 1. 5 |
| 19 | 0. 10 | 0. 70 | 0. 20 | 0. 50 | 8 | 1, 580 | 260 | 1. 3 |
| 20 | 0. 10 | 0. 70 | 0. 20 | 3. 0 | 5 | 610 | 230 | 3. 6 |
| 21 | 0. 05 | 0. 05 | 0. 90 | 0. 00 | 13 | 360 | 390 | 4. 2 |
| 22 | 0. 05 | 0. 05 | 0. 90 | 0. 10 | 11 | 720 | 350 | 1. 2 |
| 23 | 0. 05 | 0. 05 | 0. 90 | 0. 50 | 10 | 1, 750 | 330 | 1. 1 |
| 24 | 0. 05 | 0. 05 | 0. 90 | 3. 0 | 5 | 760 | 320 | 3. 5 |
| 25 | 0. 05 | 0. 20 | 0. 75 | 0. 00 | 28 | 300 | 460 | 3. 7 |
| 26 | 0. 05 | 0. 20 | 0. 75 | 0. 10 | 24 | 480 | 400 | 0. 8 |
| 27 | 0. 05 | 0. 20 | 0. 75 | 0. 20 | 24 | 910 | 410 | 1. 0 |
| 28** | 0. 05 | 0. 20 | 0. 75 | 0. 50 | 24 | 2, 480 | 340 | 1. 2 |
| 29 | 0. 05 | 0. 20 | 0. 75 | 1. 0 | 24 | 2, 980 | 340 | 1. 1 |
| 30 | 0. 05 | 0. 20 | 0. 75 | 2. 0 | 22 | 2, 000 | 320 | 1. 5 |
| 31 | 0. 05 | 0. 20 | 0. 75 | 3. 0 | 18 | 1, 180 | 290 | 2. 0 |
| 32 | 0. 05 | 0. 40 | 0. 55 | 0. 00 | 52 | 115 | 760 | 3. 7 |
| 33 | 0. 05 | 0. 40 | 0. 55 | 0. 10 | 51 | 290 | 670 | 1. 5 |
| 34 | 0. 05 | 0. 40 | 0. 55 | 0. 20 | 46 | 860 | 540 | 1. 0 |
| 35 | 0. 05 | 0. 40 | 0. 55 | 0. 50 | 45 | 2, 440 | 420 | 1. 0 |
| 36 | 0. 05 | 0. 40 | 0. 55 | 1. 0 | 37 | 1, 580 | 350 | 2. 3 |
| 37 | 0. 05 | 0. 40 | 0. 55 | 2. 0 | 31 | 1, 210 | 330 | 2. 6 |
| 38 | 0. 05 | 0. 40 | 0. 55 | 3. 0 | 28 | 1, 000 | 310 | 3. 0 |
| 39 | 0. 05 | 0. 48 | 0. 47 | 0. 00 | 57 | 100 | 1, 610 | 2. 4 |
| 40 | 0. 05 | 0. 48 | 0. 47 | 0. 10 | 38 | 220 | 1, 170 | 1. 1 |
| 41 | 0. 05 | 0. 48 | 0. 47 | 0. 20 | 42 | 580 | 1, 130 | 1. 0 |
| 42 | 0. 05 | 0. 48 | 0. 47 | 0. 50 | 58 | 2, 200 | 1, 150 | 0. 9 |
| 43 | 0. 05 | 0. 48 | 0. 47 | 1. 0 | 48 | 620 | 1, 130 | 1. 3 |
| 44 | 0. 05 | 0. 55 | 0. 40 | 0. 00 | 41 | 120 | 660 | 2. 2 |
| 45 | 9. 05 | 0. 55 | 0. 40 | 9. 10 | 23 | 340 | 630 | 0. 9 |
| 46 | 0. 05 | 0. 55 | 0. 40 | 0. 20 | 25 | 1, 380 | 550 | 0. 9 |
| 47 | 0. 05 | 0. 55 | 0. 40 | 0. 50 | 36 | 3, 560 | 620 | 0. 8 |
| 48 | 0. 05 | 0. 55 | 0. 40 | 1. 0 | 23 | 1, 910 | 460 | 1. 3 |
| 49 | 0. 05 | 0. 55 | 0. 40 | 2. 0 | 23 | 1, 180 | 390 | 1. 9 |
| 50 | 0. 05 | 0. 55 | 0. 49 | 3. 0 | 21 | 860 | 349 | 2. 2 |
| 51 | 0. 02 | 0. 47 | 0. 51 | 0. 00 | 81 | 85 | 1, 760 | 2. 6 |
| 52 | 0. 02 | 0. 47 | 0. 51 | 0. 10 | 47 | 430 | 1, 120 | 1. 1 |
| 53 | 0. 02 | 0. 47 | 0. 51 | 0. 20 | 54 | 1, 630 | 860 | 0. 9 |
| 54 | 0. 02 | 0. 47 | 0. 51 | 0. 30 | 69 | 1, 660 | 790 | 0. 9 |
| 55 | 0. 02 | 0. 47 | 0. 51 | 0. 50 | 58 | 800 | 740 | 1. 2 |
| 56 | 0. 02 | 0. 47 | 0. 51 | 1. 0 | 48 | 640 | 500 | 1. 8 |
| 57 | 0. 02 | 0. 47 | 0. 51 | 2. 0 | 42 | 450 | 460 | 2. 1 |
| 58 | 0. 02 | 0. 47 | 0. 51 | 3. 0 | 41 | 310 | 410 | 2. 5 |
| 59 | 0. 01 | 0. 09 | 0. 90 | 0. 00 | 15 | 500 | 290 | 4. 3 |
| 60 | 0. 01 | 0. 09 | 0. 90 | 0. 10 | 13 | 810 | 260 | 1. 1 |
| 61 | 0. 01 | 0. 09 | 0. 90 | 0. 50 | 12 | 1, 830 | 230 | 1. 1 |
| 62 | 0. 01 | 0. 09 | 0. 90 | 3. 0 | 6 | 880 | 220 | 3. 2 |
| 63 | 0. 01 | 0. 61 | 0. 38 | 0. 00 | 25 | 180 | 500 | 2. 8 |
| 64 | 0. 01 | 0. 61 | 0. 38 | 0. 10 | 22 | 380 | 400 | 1. 1 |
| 65** | 0. 01 | 0. 61 | 0. 38 | 0. 50 | 22 | 2, 360 | 350 | 1. 0 |
| 66 | 0. 01 | 0. 61 | 0. 38 | 3. 0 | 18 | 1, 120 | 290 | 2. 5 |

**See footnote to Table 2.

TABLE 4

| Number | Mol ratio of basic composition $Pb(Sb_{1/2}Nb_{1/2})O_3$ x | PbTiO3 y | PbZrO3 z | Additive agent MnO, wt. percent | $k_r$, percent | $Q_m$ | ε | tan δ, percent |
|---|---|---|---|---|---|---|---|---|
| 1 | 0.30 | 0.05 | 0.65 | 0.00 | 4 | 420 | 260 | 2.9 |
| 2 | 0.30 | 0.05 | 0.65 | 0.10 | 6 | 1,200 | 230 | 1.3 |
| 3 | 0.30 | 0.05 | 0.65 | 0.50 | 10 | 2,650 | 210 | 1.6 |
| 4 | 0.30 | 0.05 | 0.65 | 3.0 | 5 | 1,050 | 180 | 2.5 |
| 5 | 0.30 | 0.30 | 0.40 | 0.00 | 12 | 235 | 380 | 3.1 |
| 6 | 0.30 | 0.30 | 0.40 | 0.10 | 14 | 1,180 | 310 | 1.3 |
| 7** | 0.30 | 0.30 | 0.49 | 0.20 | 15 | 2,460 | 280 | 1.8 |
| 8 | 0.30 | 0.30 | 0.40 | 0.50 | 18 | 2,250 | 290 | 1.9 |
| 9 | 0.30 | 0.30 | 0.40 | 1.0 | 17 | 2,050 | 290 | 1.9 |
| 10 | 0.30 | 0.30 | 0.40 | 2.0 | 10 | 1,200 | 439 | 4.0 |
| 11 | 0.30 | 0.30 | 0.40 | 3.0 | 9 | 650 | 610 | 4.3 |
| 12 | 0.30 | 0.40 | 0.30 | 0.00 | 8 | 270 | 190 | 3.3 |
| 13 | 0.30 | 0.40 | 0.30 | 0.10 | 4 | 990 | 170 | 1.6 |
| 14 | 0.30 | 0.40 | 0.30 | 0.50 | 6 | 2,130 | 150 | 1.3 |
| 15 | 0.30 | 0.40 | 0.30 | 3.0 | 3 | 860 | 140 | 2.2 |
| 16 | 0.20 | 0.20 | 0.60 | 0.00 | 12 | 160 | 410 | 3.6 |
| 17 | 0.20 | 0.20 | 0.60 | 0.10 | 10 | 1,050 | 360 | 1.4 |
| 18 | 0.20 | 0.20 | 0.60 | 0.20 | 15 | 3,450 | 340 | 1.1 |
| 19 | 0.20 | 0.20 | 0.60 | 0.50 | 15 | 4,070 | 300 | 1.1 |
| 20 | 0.20 | 0.20 | 0.60 | 1.0 | 12 | 3,500 | 250 | 1.6 |
| 21 | 0.20 | 0.40 | 0.40 | 0.00 | 20 | 140 | 640 | 2.5 |
| 22 | 0.20 | 0.40 | 0.40 | 0.10 | 20 | 500 | 470 | 1.8 |
| 23 | 0.20 | 0.40 | 0.40 | 0.20 | 23 | 1,040 | 440 | 1.1 |
| 24 | 0.20 | 0.40 | 0.40 | 0.50 | 25 | 2,390 | 510 | 1.2 |
| 25 | 0.20 | 0.40 | 0.40 | 1.0 | 24 | 1,250 | 580 | 3.3 |
| 26 | 0.20 | 0.40 | 0.40 | 2.0 | 23 | 540 | 690 | 3.8 |
| 27 | 0.20 | 0.40 | 0.40 | 3.0 | 20 | 340 | 800 | 4.9 |
| 28 | 0.10 | 0.10 | 0.80 | 0.00 | 14 | 420 | 495 | 3.8 |
| 29 | 0.10 | 0.10 | 0.80 | 0.10 | 11 | 980 | 470 | 2.0 |
| 30** | 0.10 | 0.10 | 0.80 | 0.20 | 12 | 1,300 | 400 | 1.2 |
| 31 | 0.10 | 0.10 | 0.80 | 0.50 | 10 | 5,110 | 360 | 1.1 |
| 32 | 0.10 | 0.10 | 0.80 | 1.0 | 6 | 2,800 | 280 | 1.9 |
| 33 | 0.10 | 0.43 | 0.47 | 0.00 | 43 | 120 | 1,180 | 3.0 |
| 34 | 0.10 | 0.43 | 0.47 | 0.10 | 25 | 280 | 910 | 1.6 |
| 35 | 0.10 | 0.43 | 0.47 | 0.20 | 28 | 630 | 760 | 1.1 |
| 36 | 0.10 | 0.43 | 0.47 | 0.50 | 23 | 500 | 660 | 1.6 |
| 37 | 0.10 | 0.43 | 0.47 | 1.0 | 20 | 420 | 600 | 2.8 |
| 38 | 0.05 | 0.05 | 0.90 | 0.00 | 10 | 290 | 405 | 4.4 |
| 39 | 0.05 | 0.05 | 0.90 | 0.10 | 12 | 440 | 380 | 2.2 |
| 40 | 0.05 | 0.05 | 0.90 | 0.50 | 15 | 2,030 | 310 | 1.2 |
| 41 | 0.05 | 0.05 | 0.90 | 3.0 | 9 | 970 | 280 | 3.5 |
| 42 | 0.05 | 0.30 | 0.65 | 0.00 | 37 | 140 | 690 | 4.0 |
| 43 | 0.05 | 0.30 | 0.65 | 0.10 | 32 | 400 | 490 | 1.8 |
| 44 | 0.05 | 0.30 | 0.65 | 0.20 | 32 | 1,460 | 430 | 1.1 |
| 45 | 0.05 | 0.30 | 0.65 | 0.50 | 29 | 4,100 | 300 | 1.1 |
| 46 | 0.05 | 0.35 | 0.60 | 0.00 | 42 | 120 | 700 | 4.0 |
| 47 | 0.05 | 0.35 | 0.60 | 0.10 | 30 | 480 | 570 | 1.5 |
| 48 | 0.05 | 0.35 | 0.60 | 0.20 | 29 | 1,240 | 530 | 1.1 |
| 49 | 0.05 | 0.35 | 0.60 | 0.50 | 28 | 2,660 | 410 | 0.9 |
| 50 | 0.05 | 0.35 | 0.60 | 1.0 | 16 | 2,030 | 310 | 1.0 |
| 51 | 0.05 | 0.455 | 0.495 | 0.00 | 61 | 90 | 1,210 | 3.1 |
| 52 | 0.05 | 0.455 | 0.495 | 0.10 | 50 | 520 | 1,020 | 1.6 |
| 53 | 0.05 | 0.455 | 0.495 | 0.20 | 55 | 780 | 930 | 1.1 |
| 54 | 0.05 | 0.455 | 0.495 | 0.30 | 60 | 2,030 | 720 | 1.1 |
| 55** | 0.05 | 0.455 | 0.495 | 0.50 | 56 | 2,850 | 530 | 1.1 |
| 56 | 0.05 | 0.455 | 0.495 | 1.0 | 52 | 1,880 | 420 | 1.6 |
| 57 | 0.05 | 0.455 | 0.495 | 3.0 | 48 | 960 | 330 | 2.7 |
| 58 | 0.05 | 0.48 | 0.47 | 0.00 | 54 | 105 | 1,550 | 2.8 |
| 59 | 0.05 | 0.48 | 0.47 | 0.10 | 49 | 260 | 1,300 | 1.2 |
| 60 | 0.05 | 0.48 | 0.47 | 0.20 | 57 | 540 | 1,200 | 1.2 |
| 61 | 0.05 | 0.48 | 0.47 | 0.50 | 60 | 600 | 1,150 | 1.2 |
| 62 | 0.05 | 0.48 | 0.47 | 1.0 | 50 | 500 | 960 | 2.8 |
| 63 | 0.05 | 0.48 | 0.47 | 3.0 | 14 | 200 | 850 | 5.0 |
| 64 | 0.05 | 0.65 | 0.30 | 0.00 | 27 | 235 | 435 | 2.1 |
| 65 | 0.05 | 0.65 | 0.30 | 0.10 | 25 | 550 | 360 | 1.1 |
| 66 | 0.05 | 0.65 | 0.30 | 0.50 | 25 | 1,950 | 310 | 1.0 |
| 67 | 0.05 | 0.65 | 0.30 | 3.0 | 20 | 620 | 270 | 2.0 |
| 68 | 0.02 | 0.47 | 0.51 | 0.00 | 60 | 100 | 1,410 | 2.7 |
| 69 | 0.02 | 0.47 | 0.51 | 0.10 | 41 | 460 | 1,000 | 1.2 |
| 70 | 0.02 | 0.47 | 0.51 | 0.20 | 53 | 1,060 | 970 | 1.1 |
| 71 | 0.02 | 0.47 | 0.51 | 0.50 | 61 | 1,000 | 800 | 1.2 |
| 72** | 0.02 | 0.47 | 0.51 | 1.0 | 52 | 1,300 | 780 | 1.8 |
| 73 | 0.02 | 0.47 | 0.51 | 2.0 | 44 | 780 | 730 | 2.6 |
| 74 | 0.02 | 0.47 | 0.51 | 3.0 | 42 | 380 | 660 | 4.8 |
| 75 | 0.01 | 0.09 | 0.90 | 0.00 | 11 | 410 | 270 | 4.6 |
| 76 | 0.01 | 0.09 | 0.90 | 0.10 | 10 | 960 | 220 | 2.1 |
| 77** | 0.01 | 0.09 | 0.90 | 0.50 | 13 | 2,860 | 180 | 1.1 |
| 78 | 0.01 | 0.09 | 0.90 | 3.0 | 11 | 690 | 170 | 3.8 |
| 79 | 0.01 | 0.55 | 0.44 | 0.00 | 14 | 210 | 490 | 2.5 |
| 80 | 0.01 | 0.55 | 0.44 | 0.10 | 12 | 430 | 470 | 1.8 |
| 81 | 0.01 | 0.55 | 0.44 | 0.50 | 14 | 2,560 | 370 | 1.0 |
| 82 | 0.01 | 0.55 | 0.44 | 3.0 | 8 | 410 | 330 | 2.3 |

** See footnote to Table 2.

TABLE 5

$Pb(Sb_{1/2}Nb_{1/2})O_3$—$PbTiO_3$—$PbZrO_3$ SYSTEM

| No. | Basic composition x | y | z | u | Me | MnO, wt. percent | $k_r$, percent | $Q_m$ | ε | tan δ, percent |
|---|---|---|---|---|---|---|---|---|---|---|
| 1 | 0.02 | 0.48 | 0.50 | 0.10 | Ba | 0.00 | 75 | 90 | 2,160 | 2.9 |
| 2 | 0.02 | 0.48 | 0.50 | 0.10 | Ba | 0.10 | 46 | 480 | 1,260 | 1.1 |
| 3 | 0.02 | 0.48 | 0.50 | 0.10 | Ba | 0.50 | 56 | 1,210 | 790 | 1.2 |
| 4 | 0.02 | 0.48 | 0.50 | 0.10 | Ba | 3.0 | 40 | 380 | 500 | 2.5 |
| 5 | 0.02 | 0.47 | 0.51 | 0.02 | Ba | 0.00 | 79 | 90 | 1,770 | 2.6 |
| 6 | 0.02 | 0.47 | 0.51 | 0.02 | Ba | 0.10 | 46 | 510 | 1,150 | 1.0 |
| 7 | 0.02 | 0.47 | 0.51 | 0.02 | Ba | 0.50 | 59 | 1,280 | 760 | 1.3 |
| 8 | 0.02 | 0.47 | 0.51 | 0.02 | Ba | 3.0 | 41 | 410 | 450 | 2.5 |
| 9 | 0.02 | 0.47 | 0.51 | 0.10 | Ba | 0.00 | 76 | 90 | 240 | 2.5 |
| 10 | 0.02 | 0.47 | 0.51 | 0.10 | Ba | 0.10 | 45 | 460 | 1,250 | 1.1 |
| 11 | 0.02 | 0.47 | 0.51 | 0.10 | Ba | 0.50 | 56 | 1,190 | 810 | 1.3 |
| 12 | 0.02 | 0.47 | 0.51 | 0.10 | Ba | 3.0 | 38 | 450 | 530 | 2.0 |

TABLE 5.—Continued $Pb(Sb_{1/2}Nb_{1/2})O_3$—$PbTiO_3$—$PbZrO_3$ SYSTEM

| No. | Basic composition x | y | z | u | Me | MnO, wt. percent | $k_r$, percent | $Q_m$ | ε | tan δ, percent |
|---|---|---|---|---|---|---|---|---|---|---|
| 13 | 0.02 | 0.47 | 0.51 | 0.25 | Ba | 0.00 | 30 | 80 | 4,120 | 3.1 |
| 14 | 0.02 | 0.47 | 0.51 | 0.25 | Ba | 0.10 | 26 | 560 | 3,690 | 1.5 |
| 15 | 0.02 | 0.47 | 0.51 | 0.25 | Ba | 0.50 | 27 | 1,690 | 3,210 | 1.8 |
| 16 | 0.02 | 0.47 | 0.51 | 0.25 | Ba | 3.0 | 13 | 680 | 2,960 | 2.6 |
| 17 | 0.02 | 0.47 | 0.51 | 0.01 | Sr | 0.00 | 80 | 85 | 1,790 | 2.5 |
| 18 | 0.02 | 0.47 | 0.51 | 0.01 | Sr | 0.10 | 48 | 390 | 1,200 | 1.2 |
| 19 | 0.02 | 0.47 | 0.51 | 0.01 | Sr | 0.50 | 60 | 1,210 | 780 | 1.6 |
| 20 | 0.02 | 0.47 | 0.51 | 0.01 | Sr | 3.0 | 40 | 830 | 480 | 2.3 |
| 21 | 0.02 | 0.47 | 0.51 | 0.10 | Sr | 0.00 | 55 | 100 | 1,720 | 2.1 |
| 22 | 0.02 | 0.47 | 0.51 | 0.10 | Sr | 0.10 | 35 | 430 | 1,210 | 1.1 |
| 23 | 0.02 | 0.47 | 0.51 | 0.10 | Sr | 0.50 | 51 | 1,310 | 760 | 1.2 |
| 24 | 0.02 | 0.47 | 0.51 | 0.10 | Sr | 3.0 | 26 | 560 | 500 | 2.0 |
| 25 | 0.02 | 0.47 | 0.51 | 0.01 | Ca | 0.00 | 78 | 90 | 1,740 | 2.6 |
| 26 | 0.02 | 0.47 | 0.51 | 0.01 | Ca | 0.10 | 46 | 430 | 1,210 | 1.1 |
| 27 | 0.02 | 0.47 | 0.51 | 0.01 | Ca | 0.50 | 61 | 1,260 | 710 | 1.5 |
| 28 | 0.02 | 0.47 | 0.51 | 0.01 | Ca | 3.0 | 37 | 580 | 430 | 2.5 |
| 29 | 0.02 | 0.46 | 0.52 | 0.05 | Sr | 0.00 | 79 | 85 | 2,140 | 2.6 |
| 30 | 0.02 | 0.46 | 0.52 | 0.05 | Sr | 0.10 | 48 | 390 | 1,590 | 1.3 |
| 31 | 0.02 | 0.46 | 0.52 | 0.05 | Sr | 0.50 | 63 | 1,060 | 1,360 | 1.6 |
| 32 | 0.02 | 0.46 | 0.52 | 0.05 | Sr | 3.0 | 40 | 490 | 810 | 2.5 |
| 33 | 0.02 | 0.45 | 0.53 | 0.05 | Ca | 0.00 | 75 | 90 | 2,180 | 2.7 |
| 34 | 0.02 | 0.45 | 0.53 | 0.05 | Ca | 0.10 | 43 | 390 | 1,560 | 1.5 |
| 35 | 0.02 | 0.45 | 0.53 | 0.05 | Ca | 0.50 | 55 | 1,310 | 1,230 | 1.6 |
| 36 | 0.02 | 0.45 | 0.53 | 0.05 | Ca | 3.0 | 36 | 580 | 900 | 2.6 |
| 37 | 0.02 | 0.44 | 0.54 | 0.10 | Sr | 0.00 | 77 | 80 | 2,730 | 2.7 |
| 38 | 0.02 | 0.44 | 0.54 | 0.10 | Sr | 0.10 | 45 | 510 | 2,390 | 1.5 |
| 39 | 0.02 | 0.44 | 0.54 | 0.10 | Sr | 0.50 | 59 | 1,220 | 1,850 | 1.5 |
| 40 | 0.02 | 0.44 | 0.54 | 0.10 | Sr | 3.0 | 38 | 540 | 1,590 | 2.6 |
| 41 | 0.02 | 0.42 | 0.56 | 0.10 | Ca | 0.00 | 65 | 75 | 2,860 | 2.9 |
| 42 | 0.02 | 0.42 | 0.56 | 0.10 | Ca | 0.10 | 40 | 480 | 2,360 | 1.2 |
| 43 | 0.02 | 0.42 | 0.56 | 0.10 | Ca | 0.50 | 52 | 1,230 | 1,980 | 1.8 |
| 44 | 0.02 | 0.42 | 0.56 | 0.10 | Ca | 3.0 | 31 | 660 | 1,580 | 2.8 |
| 45 | 0.02 | 0.41 | 0.57 | 0.20 | Sr | 0.00 | 62 | 70 | 4,030 | 2.9 |
| 46 | 0.02 | 0.41 | 0.57 | 0.20 | Sr | 0.10 | 38 | 480 | 3,810 | 1.5 |
| 47 | 0.02 | 0.41 | 0.57 | 0.20 | Sr | 0.50 | 51 | 1,510 | 3,410 | 1.9 |
| 48 | 0.02 | 0.41 | 0.57 | 0.20 | Sr | 3.0 | 52 | 650 | 2,990 | 2.8 |

TABLE 6

$Pb(Sb_{1/2}Ta_{1/2})O_3$-$PbTiO_3$-$PbZrO_3$ SYSTEM

| No. | Basic composition x | y | z | u | Me | MnO, wt. percent | $k_r$, percent | $Q_m$ | ε | tan δ, percent |
|---|---|---|---|---|---|---|---|---|---|---|
| 1 | 0.02 | 0.47 | 0.51 | 0.02 | Ba | 0.00 | 66 | 100 | 1,470 | 2.7 |
| 2 | 0.02 | 0.47 | 0.51 | 0.02 | Ba | 0.10 | 40 | 470 | 1,050 | 1.1 |
| 3 | 0.02 | 0.47 | 0.51 | 0.02 | Ba | 0.50 | 61 | 1,580 | 940 | 1.2 |
| 4 | 0.02 | 0.47 | 0.51 | 0.02 | Ba | 3.0 | 42 | 410 | 690 | 2.7 |
| 5 | 0.02 | 0.47 | 0.51 | 0.10 | Ba | 0.00 | 62 | 85 | 1.770 | 2.7 |
| 6 | 0.02 | 0.47 | 0.51 | 0.10 | Ba | 0.10 | 38 | 460 | 1,430 | 1.2 |
| 7 | 0.02 | 0.47 | 0.51 | 0.10 | Ba | 0.50 | 56 | 1,480 | 1,210 | 1.2 |
| 8 | 0.02 | 0.47 | 0.51 | 0.10 | Ba | 3.0 | 35 | 420 | 880 | 2.5 |
| 9 | 0.02 | 0.47 | 0.51 | 0.25 | Ba | 0.00 | 32 | 80 | 3,840 | 3.8 |
| 10 | 0.02 | 0.47 | 0.51 | 0.25 | Ba | 0.10 | 30 | 550 | 3,210 | 1.5 |
| 11 | 0.02 | 0.47 | 0.51 | 0.25 | Ba | 0.50 | 30 | 1,750 | 2,880 | 1.9 |
| 12 | 0.02 | 0.47 | 0.51 | 0.25 | Ba | 3.0 | 23 | 630 | 2,530 | 2.9 |
| 13 | 0.02 | 0.47 | 0.51 | 0.01 | Sr | 0.00 | 69 | 100 | 1,430 | 2.7 |
| 14 | 0.02 | 0.47 | 0.51 | 0.01 | Sr | 0.10 | 42 | 480 | 1,040 | 1.2 |
| 15 | 0.02 | 0.47 | 0.51 | 0.01 | Sr | 0.50 | 62 | 1,660 | 800 | 1.3 |
| 16 | 0.02 | 0.47 | 0.51 | 0.01 | Sr | 3.0 | 40 | 430 | 680 | 2.6 |
| 17 | 0.02 | 0.47 | 0.51 | 0.01 | Ca | 0.00 | 67 | 95 | 1,440 | 2.7 |
| 18 | 0.02 | 0.47 | 0.51 | 0.01 | Ca | 0.10 | 40 | 490 | 1,000 | 1.2 |
| 19 | 0.02 | 0.47 | 0.51 | 0.01 | Ca | 0.50 | 61 | 1,720 | 720 | 1.3 |
| 20 | 0.02 | 0.47 | 0.51 | 0.01 | Ca | 3.0 | 38 | 510 | 630 | 2.5 |
| 21 | 0.02 | 0.46 | 0.52 | 0.05 | Sr | 0.00 | 68 | 95 | 1,620 | 2.8 |
| 22 | 0.02 | 0.46 | 0.52 | 0.05 | Sr | 0.10 | 44 | 510 | 1,230 | 1.2 |
| 23 | 0.02 | 0.46 | 0.52 | 0.05 | Sr | 0.50 | 62 | 1,710 | 860 | 1.5 |
| 24 | 0.02 | 0.46 | 0.52 | 0.05 | Sr | 3.0 | 40 | 480 | 660 | 2.6 |
| 25 | 0.02 | 0.45 | 0.53 | 0.05 | Ca | 0.00 | 64 | 90 | 1,660 | 2.9 |
| 26 | 0.02 | 0.45 | 0.53 | 0.05 | Ca | 0.10 | 41 | 450 | 1,310 | 1.2 |
| 27 | 0.02 | 0.45 | 0.53 | 0.05 | Ca | 0.50 | 60 | 1,490 | 1,140 | 1.8 |
| 28 | 0.02 | 0.45 | 0.53 | 0.05 | Ca | 3.0 | 31 | 400 | 740 | 2.5 |
| 29 | 0.02 | 0.44 | 0.54 | 0.10 | Sr | 0.00 | 65 | 90 | 2,010 | 2.8 |
| 30 | 0.02 | 0.44 | 0.54 | 0.10 | Sr | 0.10 | 40 | 500 | 1,590 | 1.2 |
| 31 | 0.02 | 0.44 | 0.54 | 0.10 | Sr | 0.50 | 62 | 1,580 | 1,300 | 1.7 |
| 32 | 0.02 | 0.44 | 0.54 | 0.10 | Sr | 3.0 | 32 | 470 | 880 | 2.7 |
| 33 | 0.02 | 0.42 | 0.56 | 0.10 | Ca | 0.00 | 57 | 80 | 2,050 | 3.1 |
| 34 | 0.02 | 0.42 | 0.56 | 0.10 | Ca | 0.10 | 36 | 390 | 1,480 | 1.5 |
| 35 | 0.02 | 0.42 | 0.56 | 0.10 | Ca | 0.50 | 54 | 1,660 | 1,290 | 1.8 |
| 36 | 0.02 | 0.42 | 0.56 | 0.10 | Ca | 3.0 | 27 | 520 | 930 | 2.8 |
| 37 | 0.02 | 0.41 | 0.57 | 0.20 | Sr | 0.00 | 54 | 80 | 3,770 | 3.3 |
| 38 | 0.02 | 0.41 | 0.57 | 0.20 | Sr | 0.10 | 32 | 420 | 3,250 | 1.8 |
| 39 | 0.02 | 0.41 | 0.57 | 0.20 | Sr | 0.50 | 50 | 1,570 | 2,890 | 2.0 |
| 40 | 0.02 | 0.41 | 0.57 | 0.20 | Sr | 3.0 | 26 | 460 | 2,600 | 3.0 |

TABLE 7

| No. | Mol ratio of composition $PbTiO_3$ | $PbZrO_3$ | $k_r$, percent | $Q_n$ | ε | tan δ, percent |
|---|---|---|---|---|---|---|
| 1 | 0.70 | 0.30 | | | 340 | 5.7 |
| 2 | 0.60 | 0.40 | | | 300 | 2.4 |
| 3 | 0.55 | 0.45 | 8 | 30 | 350 | 1.3 |
| 4 | 0.48 | 0.52 | 42 | 250 | 1,060 | 1.6 |
| 5 | 0.45 | 0.55 | 38 | 290 | 640 | 3.0 |
| 6 | 0.40 | 0.60 | 30 | 320 | 460 | 3.4 |
| 7 | 0.30 | 0.70 | 24 | 380 | 380 | 3.1 |
| 8 | 0.20 | 0.80 | 15 | 470 | 350 | 3.3 |
| 9 | 0.10 | 0.90 | 10 | 580 | 280 | 3.3 |

NOTE.—For the specimens Nos. 1 and 2, the evaluation of piezoelectric activities was not possible.

What is claimed is:

1. Piezoelectric ceramics consisting essentially of the composition which is represented by the formula:

$$[Pb(Sb_{1/2}Z_{1/2})O_3]_x[PbTiO_3]_y[PbZrO_3]_z$$

where $x$, $y$ and $z$ represent a set of molecular ratios and $x+y+z=1.00$ and where Z represents one element selected from the group consisting of Nb and Ta, and which composition falls within the area A–B–C–D–E of FIG. 1 of the drawings where Nb is selected for Z and within the area F–G–H–I–J–K of FIG. 4 of the drawings where Ta is selected for Z, the sets of molecular ratios of the vertices of said areas being as follows:

| | x | y | z |
|---|---|---|---|
| A | 0.01 | 0.61 | 0.38 |
| B | 0.01 | 0.09 | 0.90 |
| C | 0.05 | 0.05 | 0.90 |
| D | 0.30 | 0.30 | 0.40 |
| E | 0.10 | 0.70 | 0.20 |
| F | 0.01 | 0.55 | 0.44 |
| G | 0.01 | 0.09 | 0.90 |
| H | 0.05 | 0.05 | 0.90 |
| I | 0.30 | 0.05 | 0.65 |
| J | 0.30 | 0.40 | 0.30 |
| K | 0.05 | 0.65 | 0.30 |

2. The piezoelectric ceramics of claim 1, wherein up to about 25 atom percent of Pb is replaced by at least one element from the group consisting of Ba, Sr and Ca.

3. The piezoelectric ceramics of claim 1, wherein manganese oxide is incorporated in an amount of about 0.10 to 3.0 weight percent in the form of MnO.

4. The piezoelectric ceramics of claim 1, wherein Z is Nb, and wherein the composition falls within the area A–B–C–D–E of FIG. 1 of the drawings, the sets of molecular ratios of the vertices of said area being as follows:

| | x | y | z |
|---|---|---|---|
| A | 0.01 | 0.61 | 0.38 |
| B | 0.01 | 0.09 | 0.90 |
| C | 0.05 | 0.05 | 0.90 |
| D | 0.30 | 0.30 | 0.40 |
| E | 0.10 | 0.70 | 0.20 |

5. The piezoelectric ceramics of claim 4 wherein up to about 25 atom percent of Pb is replaced by at least one element from the group consisting of Ba, Sr and Ca.

6. The piezoelectric ceramics of claim 4, wherein manganese oxide is incorporated in an amount of about 0.10 to 3.0 weight percent in the form of MnO.

7. The piezoelectric ceramic of claim 1, wherein Z is Ta, and wherein the composition falls within the area F–G–H–I–J–K of FIG. 4 of the drawings, the sets of molecular ratios of the vertices of said areas being as follows:

| | x | y | z |
|---|---|---|---|
| F | 0.01 | 0.55 | 0.44 |
| G | 0.01 | 0.09 | 0.90 |
| H | 0.05 | 0.05 | 0.90 |
| I | 0.30 | 0.05 | 0.65 |
| J | 0.30 | 0.40 | 0.30 |
| K | 0.05 | 0.65 | 0.30 |

8. The piezoelectric ceramic of claim 7, wherein up to about 25 atom percent of Pb is replaced by at least one element from the group consisting of Ba, Sr and Ca.

9. The piezoelectric ceramic of claim 7, wherein manganese oxide is incorporated in an amount of about 0.10 to 3.0 weight percent in the form of MnO.

References Cited

UNITED STATES PATENTS 3,424,686 1/1969 Ouchi et al. ________ 252—62.9
3,425,944 2/1969 Ouchi et al. ________ 252—62.9
3,468,800 9/1969 Yokoyama et al. ____ 252—62.9

TOBIAS E. LEVOW, Primary Examiner
J. COOPER, Assistant Examiner

U.S. Cl. X.R.

106—39